US008838042B2

(12) United States Patent
Lu et al.

(10) Patent No.: US 8,838,042 B2
(45) Date of Patent: Sep. 16, 2014

(54) RF FRONT-END WITH INTEGRATED T/R SWITCH

(75) Inventors: Yuan Lu, Sunnyvale, CA (US); Renaldi Winoto, Danville, CA (US); Jinho Park, San Jose, CA (US); Li Lin, Saratoga, CA (US); Xinhua Chen, Santa Clara, CA (US); Ming He, Fremont, CA (US); David Signoff, Mountain View, CA (US); Wayne Loeb, San Francisco, CA (US)

(73) Assignee: Marvell World Trade Ltd., St. Michael (BB)

( * ) Notice: Subject to any disclaimer, the term of this patent is extended or adjusted under 35 U.S.C. 154(b) by 615 days.

(21) Appl. No.: 13/107,729

(22) Filed: May 13, 2011

(65) Prior Publication Data

US 2011/0285475 A1    Nov. 24, 2011

Related U.S. Application Data

(60) Provisional application No. 61/347,112, filed on May 21, 2010.

(51) Int. Cl.
H04B 1/38 (2006.01)
H04B 1/48 (2006.01)

(52) U.S. Cl.
CPC .......................... H04B 1/48 (2013.01)
USPC ........................................... 455/73

(58) Field of Classification Search
USPC ........................................... 455/73
See application file for complete search history.

(56) References Cited

U.S. PATENT DOCUMENTS

| 7,756,486 | B1 * | 7/2010 | Tan et al. .................... 455/73 |
| 8,442,451 | B1 * | 5/2013 | Tan et al. .................... 455/73 |
| 2004/0232982 | A1 | 11/2004 | Ichitsubo et al. |
| 2004/0253939 | A1 | 12/2004 | Castaneda et al. |
| 2007/0213027 | A1 | 9/2007 | Rofougaran et al. |
| 2008/0142935 | A1 | 6/2008 | Montoriol et al. |
| 2009/0116510 | A1 | 5/2009 | Georgantas et al. |
| 2009/0206962 | A1 | 8/2009 | Chou et al. |

OTHER PUBLICATIONS

PCT International Search Report, Application No. PCT/US11/36520, Aug. 26, 2011.

* cited by examiner

*Primary Examiner* — David Bilodeau

(57) ABSTRACT

Disclosed is a transmit/receive circuit arrangement wherein a transceiver circuit including a transmit/receive switch is fabricated on an integrated circuit chip. A matching network is wholly disposed off-chip relative to the integrated circuit chip. In embodiments, at least a portion of the matching network is formed off-chip and a portion of the matching network is formed on-chip.

23 Claims, 7 Drawing Sheets

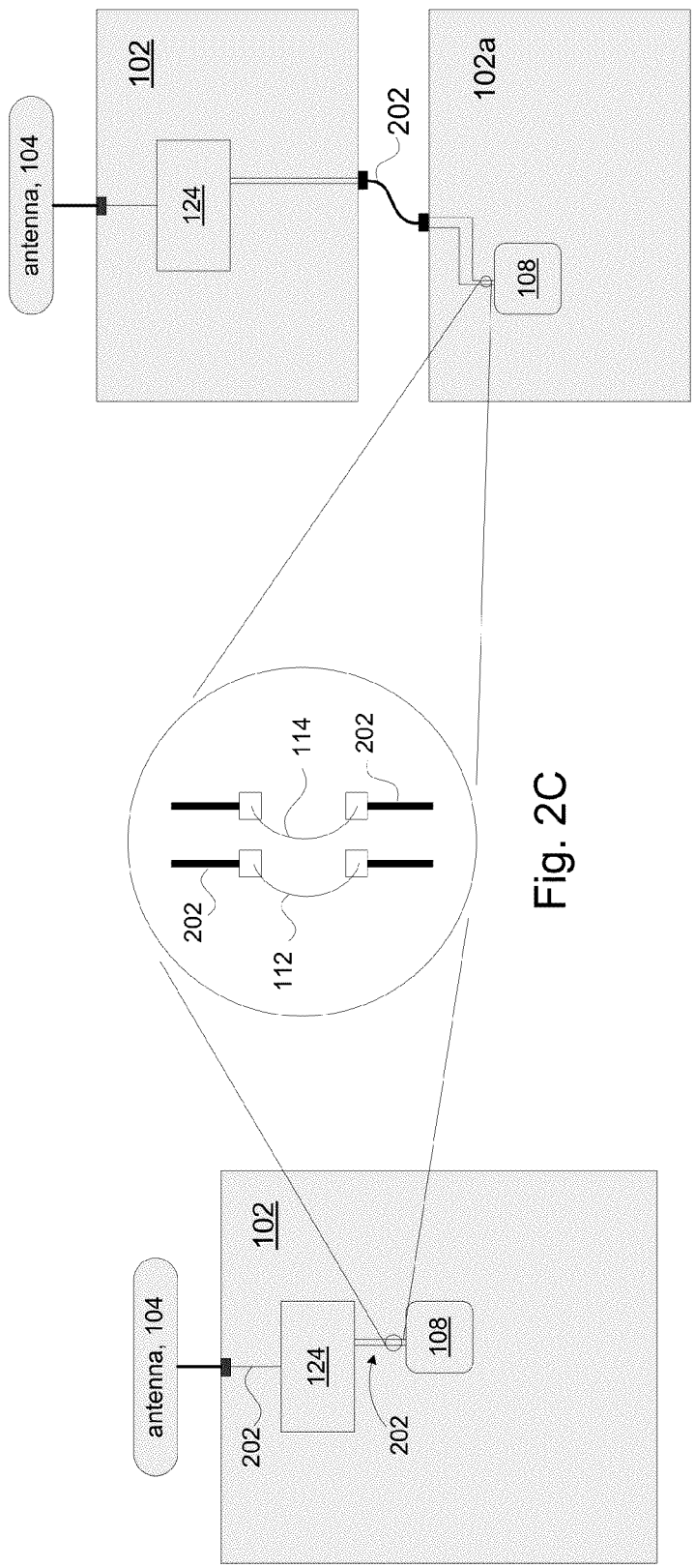

RF FRONT-END WITH INTEGRATED T/R SWITCH

CROSS REFERENCE TO RELATED APPLICATIONS

The present disclosure claims priority to U.S. Provisional App. No. 61/347,112 for filed May 21, 2010, and is incorporated herein by reference in its entirety for all purposes.

BACKGROUND

The present invention relates generally to wireless communication circuits, and in particular to transmit and receive switches.

Unless otherwise indicated herein, the approaches described in this section are not prior art to the claims in this application and are not admitted to be prior art by inclusion in this section.

One of the more important components in present-day wireless communication equipment is the RF (radio frequency) switch. The purpose of an RF switch is to connect/disconnect an antenna between the transmitter circuitry and the receiver circuitry. Accordingly, such switches are commonly referred to as T/R switches (transmit/receive). T/R designs typically include impedance matching circuitry to direct the high power transmit signal to the antenna while at the same time preventing that signal from entering the sensitive front end of the local receiver (transmit mode), and also allowing a low-loss connection between the antenna and the receiver (receive mode).

For wireless applications (e.g., mobile devices) it is desirable to reduce the size of the RF board and to lower the cost. These two goals can be achieved by fully integrate the T/R switch on-chip; in other words using integrated circuit techniques to form the T/R switch on an integrated circuit (IC) chip. FIG. 6 shows a schematic illustration of a conventional fully integrated on-chip arrangement of a T/R switch circuit based on CMOS (complementary metal-oxide semiconductor) technology.

The IC chip in FIG. 6 includes a power amplifier which can output a transmit signal to be broadcast by an antenna. A low-noise amplifier can accept a receive signal that is sensed by the antenna to be amplified for further processing. The power amplifier and low-noise amplifier can be components which constitutes a transceiver circuit. The circuit arrangement that is between the power amplifier and the low-noise amplifier can be collectively referred to as the T/R switch. The T/R switch includes switch elements (e.g., transistors $M_T$, $M_{RS}$, and $M_{RP}$) and impedance matching components (e.g., inductors such as inductor $L_{RS}$, and capacitors $C_C$, $C_{RS}$, and $C_S$). The IC chip includes a single tx/rx pin to output the transmit signal for transmission by an antenna and to input a receive signal sensed by the antenna. The switch elements ($M_T$, $M_{RS}$, and $M_{RP}$) control whether the transmit signal is output on the tx/rx pin or the signal sensed by the antenna is input via the tx/rx pin. The impedance matching components provide impedance matching between the power amplifier and the antenna, and between the low-noise amplifier and the antenna.

The IC chip is typically assembled on a printed circuit board (PCB), and connected to an "off-chip" component. For example, a balun (balance-unbalance) filter is a typical off-chip component used with the antenna and is assembled on the PCB along with the IC chip. The single tx/rx pin of the IC chip can be connected to the balun filter via a trace formed on the PCB between the tx/rx pin and a pin on the balun filter. Alternatively, the tx/rx pin and balun pin can be connected to respective pads on the PCB, and a bonding wire can be soldered to the pads to make the connection.

The quality factors of on-chip matching components, especially inductors, are usually quite poor due to metal resistance and lossy properties of silicon substrates. Poor quality factors result in limited transmit power and receive sensitivity performance. With on-chip matching components, there is loss of flexibility in fine tuning the RF switch. Since the inductors and capacitors are fabricated on-chip, it is not practical to vary their component values in case fine tuning is needed, for example, to accommodate for impedance variations in the antenna/balun filter assembly. In addition, component values of the on-chip matching elements are subject to process variations and thus may vary from one lot of chips to another. Also, there is loss of flexibility to accommodate different package designs.

These and other issues are addressed by embodiments of the present invention, individually and collectively.

SUMMARY

A circuit configuration in accordance with embodiments of the present invention includes an integrated circuit (IC) having first and second switching elements. The first switching element may provide a transmit signal to the antenna. The second switching element may receive a received signal sensed by the antenna. The IC includes a first pin and a second pin to respectively transmit and receive signals. An off-chip impedance matching circuit is separate from the IC, but electrically connected to the IC. The impedance matching circuit includes a single electrical connection to the antenna.

In and embodiment, the impedance matching circuit comprises one or more capacitive or inductive components.

In an embodiment, the impedance matching circuit can be affixed to a printed circuit board PCB) and the IC can affixed to the PCB or to separate PCB.

In an embodiment, the IC includes an on-chip impedance matching network.

In an embodiment, a method for a circuit includes receiving a transmit signal on an IC chip and outputting the transmit signal to a first pin of the IC chip. The transmit signal is received by an impedance matching network that is off-chip with respect to the IC chip. The transmit signal is then output to an antenna via a terminal of the impedance matching network. The method further includes receiving at the terminal of the impedance matching network a received signal sensed by the antenna and outputting the received signal to a second pin of the IC chip. In an embodiment, the received signal is received by a second amplifier of the IC chip.

A circuit configuration in accordance with embodiments of the present invention includes a printed circuit board having disposed on it an antenna assembly, an impedance matching network, and a transceiver integrated circuit. The impedance matching network includes a single connection to the antenna assembly. The transceiver integrated circuit includes a first amplifier configured to output a transmit signal on a first pin, and a second amplifier configured to receive a received signal on a second pin. The impedance matching network provides impedance matching between the first pin and second pin of the transceiver integrated circuit and the single terminal connected to the antenna assembly.

In an embodiment, the transceiver integrated circuit does not include any impedance matching network circuitry.

In an embodiment, the transceiver integrated circuit includes on-chip impedance matching network circuitry.

The following detailed description and accompanying drawings provide a better understanding of the nature and advantages of the present invention.

BRIEF DESCRIPTION OF THE DRAWINGS

FIG. 2 shows alternate circuit configurations in accordance with the present invention.

DETAILED DESCRIPTION

Described herein are illustrative embodiments of a T/R switch circuit arrangement for an RF front-end.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1A:
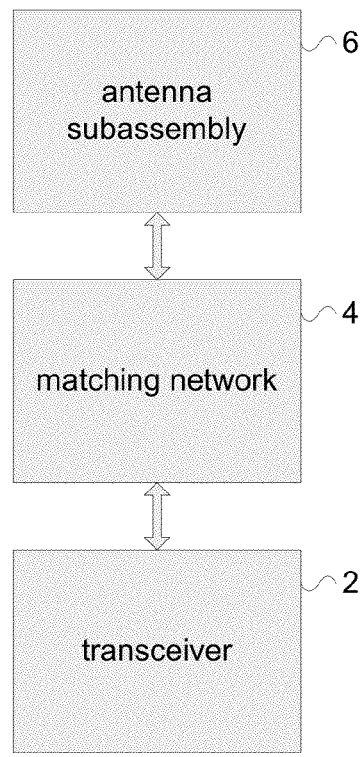
FIG. 1A shows a high level block diagram of the present invention.

FIG. 1A is a high level block diagram of a transmit/receive (T/R) circuit in accordance with the present invention. A transceiver circuit 2 may include a transmit circuit for producing a signal suitable for transmission by an antenna (in the antenna assembly 6) and receiver circuit for receiving a received signal sensed by the antenna. The transceiver circuit 2 may include a transmit/receive switch to switch between outputting a transmit signal or receiving a received signal. A matching network 4 provides impedance matching between the antenna assembly 6 and the transceiver circuit 2 in order to maximize power transfer, reduce reflection of signals and so on. The antenna assembly 6 may include the antenna itself and may include other supporting circuitry; for example, a balun filter.

Figure 1B:
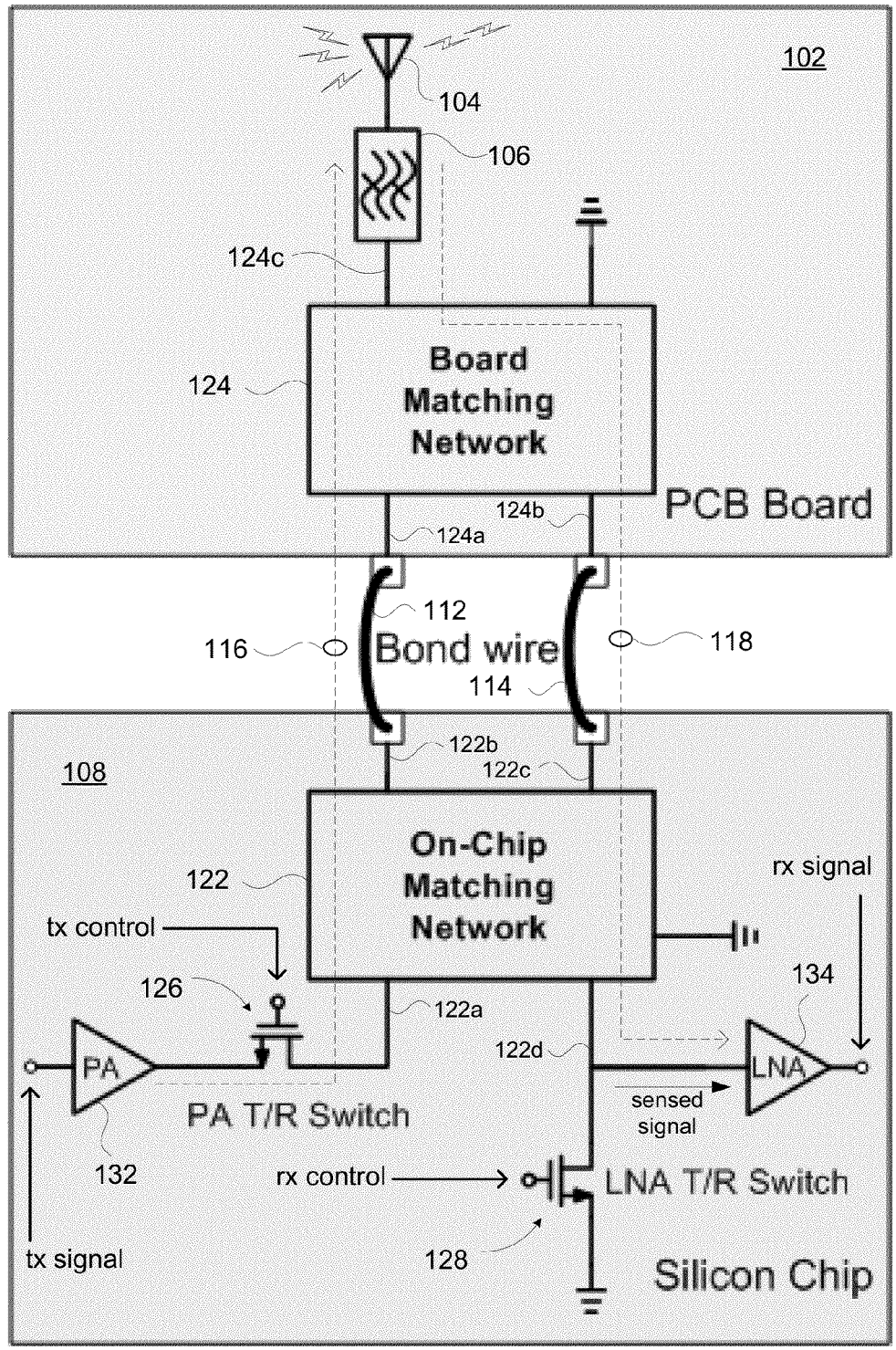
FIG. 1B shows an embodiment of the present invention.

Referring to FIG. 1B, a T/R (transmit/receive) circuit arrangement in accordance with the present invention includes an IC chip 108 comprising circuitry for transmitting signals and receiving signals and corresponding switching circuitry to switch between transmit mode and receive mode. In an embodiment, the matching network 4 (FIG. 1A) may comprise board matching network 124 for matching the impedance between an antenna 104 and the circuitry in IC chip 108. Further in accordance with the present invention, the board matching network 124 is "off-chip" with respect to the IC chip 108. In other words, the board matching network 124 is a component that is not fabricated on the IC chip 108, but rather is a component that is physically separate from the IC chip. In an embodiment, the board matching network 124 is assembled on a printed circuit board (PCB) 102. The IC chip 108 can be connected to the PCB 102, for example, via bond wires 112, 114. An antenna assembly comprising the antenna 104 and a balun filter 106 can be assembled on the PCB 102.

The board matching network 124 may include a terminal 124a configured to receive an incoming signal, a terminal 124b configured to output an outgoing signal, and terminal 124c configured to output a signal to be transmitted by the antenna 104 and to receive a signal sensed or otherwise received by the antenna. The bond wires 112, 114 may have inductive characteristics. Accordingly, in an embodiment, the bond wires 112, 114 can be considered part of the board matching network 124.

In embodiments, the IC chip 108 may include a power amplifier 132 and a low-noise amplifier (LNA) 134. The amplifiers 132, 134 can be components of a transceiver circuit (not shown). The IC chip 108 may further include T/R switches 126, 128. For example, the T/R switches 126, 128 shown in FIG. 1B are CMOS NPN transistors. A PA T/R switch 126 can be connected to an output of the power amplifier 132. The PA T/R switch 126 can be configured to enable or prevent conduction of the transmit signal along signal path 116.

An LNA T/R switch 128 can be connected to an input of the amplifier 134. In embodiments, the amplifier 134 can be a low-noise amplifier that receives and amplifies a signal sensed by the antenna 104. The LNA T/R switch 128 can be configured to enable or prevent conduction, in response to a control signal (rx control), of the sensed signal appearing at an output 122d of an on-chip matching network 122 (discussed below) to an input of the amplifier 134.

In a transmit mode of operation, a signal to be transmitted (tx signal) is provided to the power amplifier 132. The output of the power amplifier 132 constitutes a transmit signal that essentially follows signal path 116 toward the antenna 104, where it is broadcast. In a receive mode of operation, signals sensed (i.e., received) by the antenna 104 essentially follows signal path 118 toward the amplifier 134. The amplifier 134 amplifies the sensed signal to produce an output that constitutes a received signal (rx signal) which can be provided to downstream circuits (not shown) for further processing.

As mentioned above, in accordance with the present invention, the matching network 4 comprises board matching network 124. In embodiments, the matching network 4 may further comprise the on-chip impedance matching network 122 fabricated on the IC chip 108. The on-chip matching network 122 may include a terminal 122a configured to receive via switch 126 the output (transmit signal) of the power amplifier 132. Terminals 122b and 122c may be connected to respective external pins (not shown) of the IC chip 108. The terminal 122b is configured to output the transmit signal to the external pin. The terminal 122c is configured to receive the signal sensed by the antenna 104. A terminal 122d is configured to provide the signal sensed by the antenna 104 to amplifier 134. The bond wires 112, 114 may have inductive characteristics. Accordingly, in an embodiment, the bond wires 112, 114 can be considered part of the board matching network 124.

Referring to FIG. 2A, in embodiments, the IC chip 108 can be assembled on the same PCB 102 as the board matching network 122, and connected together by traces 202 formed on the PCB 102. The antenna 104 can be provided separate from the PCB 102. In FIG. 2B, an embodiment is shown wherein the IC chip 108 can be assembled on a PCB 102a different from the PCB 102. A suitable connector 204 (e.g., flex connector) can be used to connect the PCB 102 and the PCB 102a. It will be appreciated that the matching network (either on-chip matching network 122 or board matching network 124, or both) can be further configured to account of the impedance present in the connector 204. A magnified area of FIG. 2C shows the bond wire 112, 114 connections to the traces 202.

Figure 3:
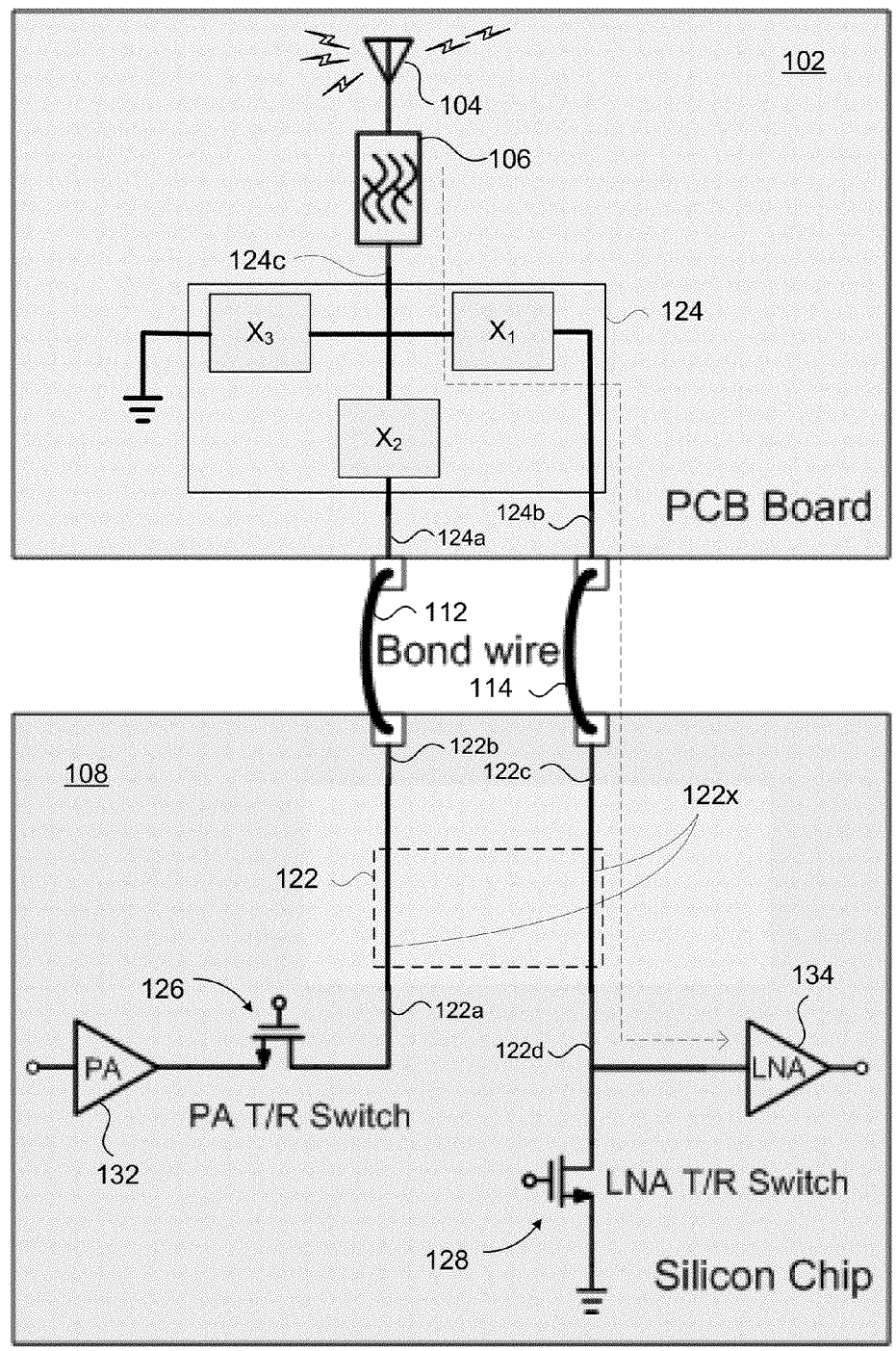
FIG. 3 shows an embodiment of the board matching network.

Referring to FIG. 3, in an embodiment, all of the impedance matching components of the matching network 6 (FIG. 1) can be provided by the board matching network 124. In other words, all of the matching components are "off-chip" in that none of the matching components are fabricated on the IC chip 108. In this embodiment, the on-chip matching network 122 in the IC chip 108 is effectively absent, comprising only traces 122x formed in a metal layer of the IC chip. The board matching network 124 comprises reactive elements $X_1$-$X_3$, and can be any suitable combination of inductors and/or capacitors.

During receive mode operation, the PA T/R switch 126 and the LNA T/R switch 128 are OFF, so that signals sensed by the antenna 104 will essentially follow signal path 118. Accordingly, the impedances that arise include the input impedance of the low-noise amplifier 134 seen at terminal 124b and some parasitic impedance seen at element $X_2$. The $X_1$ and $X_3$ elements constitute an L-matching network and can be designed with element values based on the input impedance of the low-noise amplifier 134 and the parasitic impedance to transform those impedances to match the impedance of the antenna 104 and balun filter 106 assembly, for example 50Ω.

During transmit mode operation, the PA T/R switch 126 and the LNA T/R switch 128 are ON; the LNA T/R switch acts as a shunt to ground, thus bypassing the input to the low-noise amplifier 134. Accordingly, the impedances that arise during include the low impedance path (e.g., several ohms) seen at terminal 124b due to the shunt. The $X_1$ element together with the $X_2$ and $X_3$ elements can be designed to be resonant with the balun filter 106 at the transmit frequency, thus maximizing the transmit output power delivered to the antenna 104.

Figure 3A:
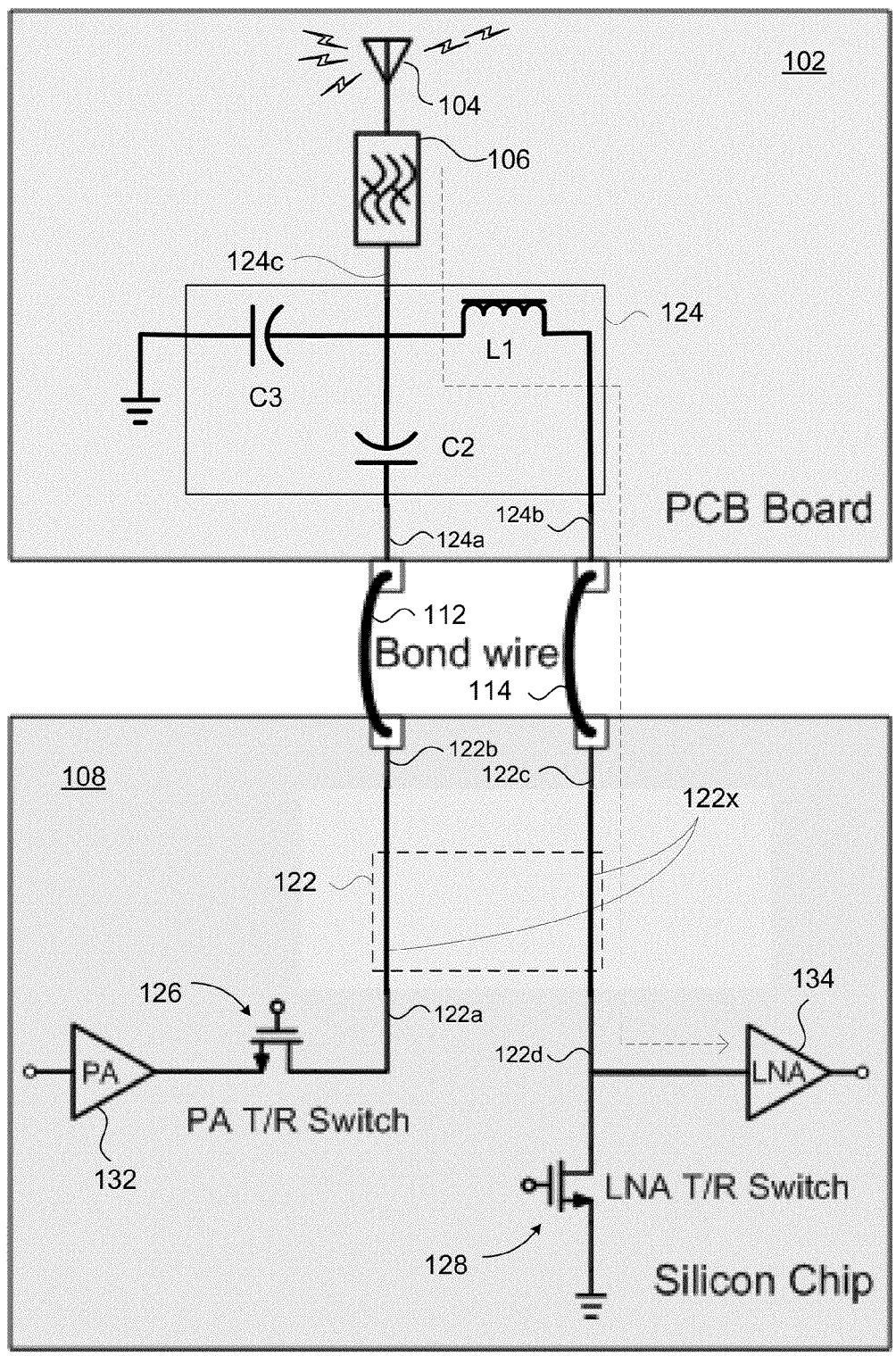
FIG. 3A shows a particular implementation of the board matching network.

FIG. 3A shows an example of a more specific embodiment. Capacitors C2 and C3 and inductor L1 are provided off-chip. For example, capacitors C2 and C3, and inductor L1 can be discrete components. Capacitors C2 and C3 can be IC components provided in discrete form and are assembled off-chip. The particular embodiment shown in FIG. 3A offers maximum flexibility in terms of accommodating changes to the matching network 6 because it is contained off-chip in board matching network 124. However, the cost of having exclusively off-chip components may constitute an unacceptable cost in manufacture. For example, while low-cost discrete off-chip capacitors may be available, discrete inductors tend to be more expensive.

Figure 4:
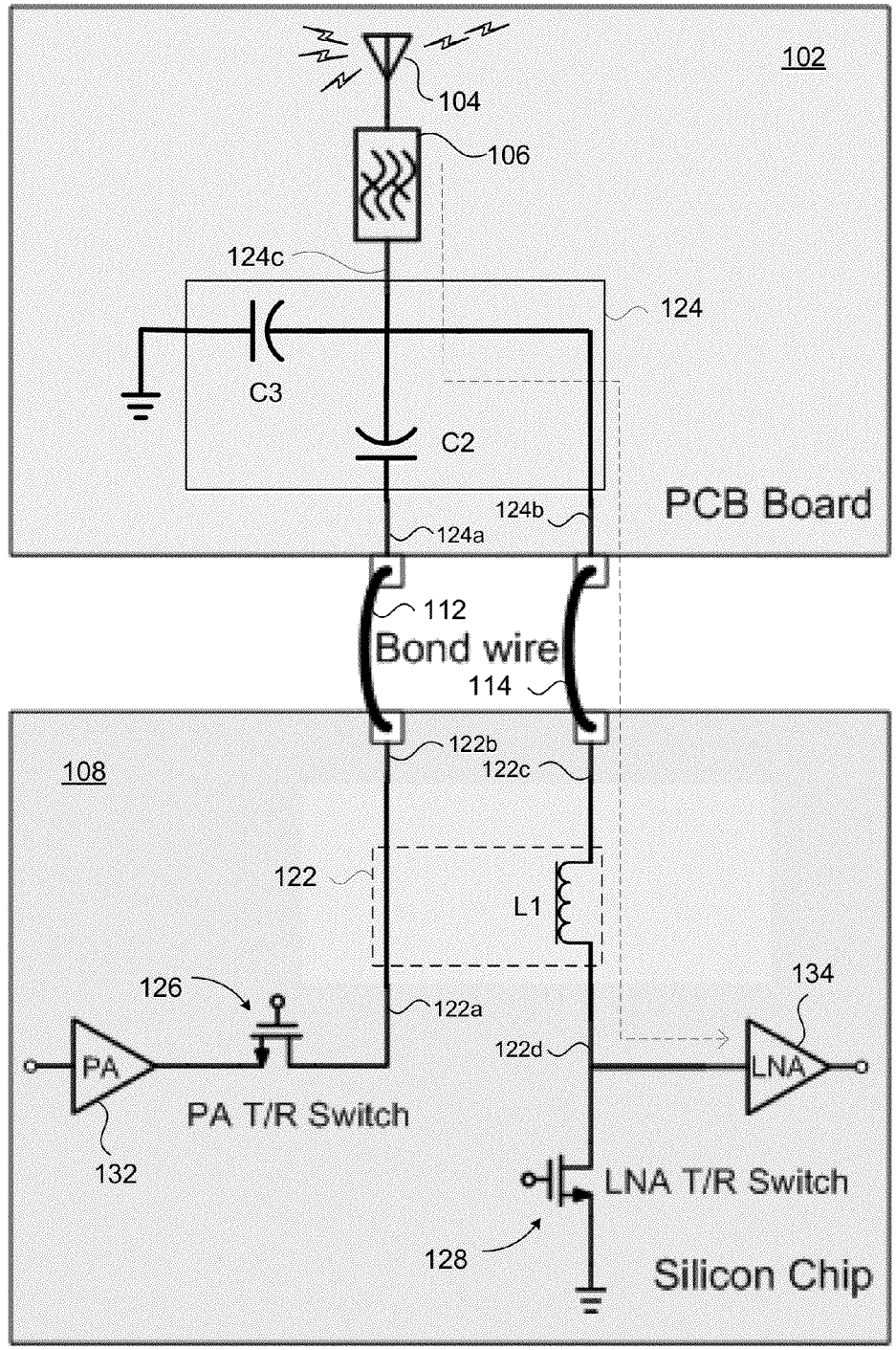
FIG. 4 shows a particular implementation of the board matching network and the on-chip matching network.
Figure 6:
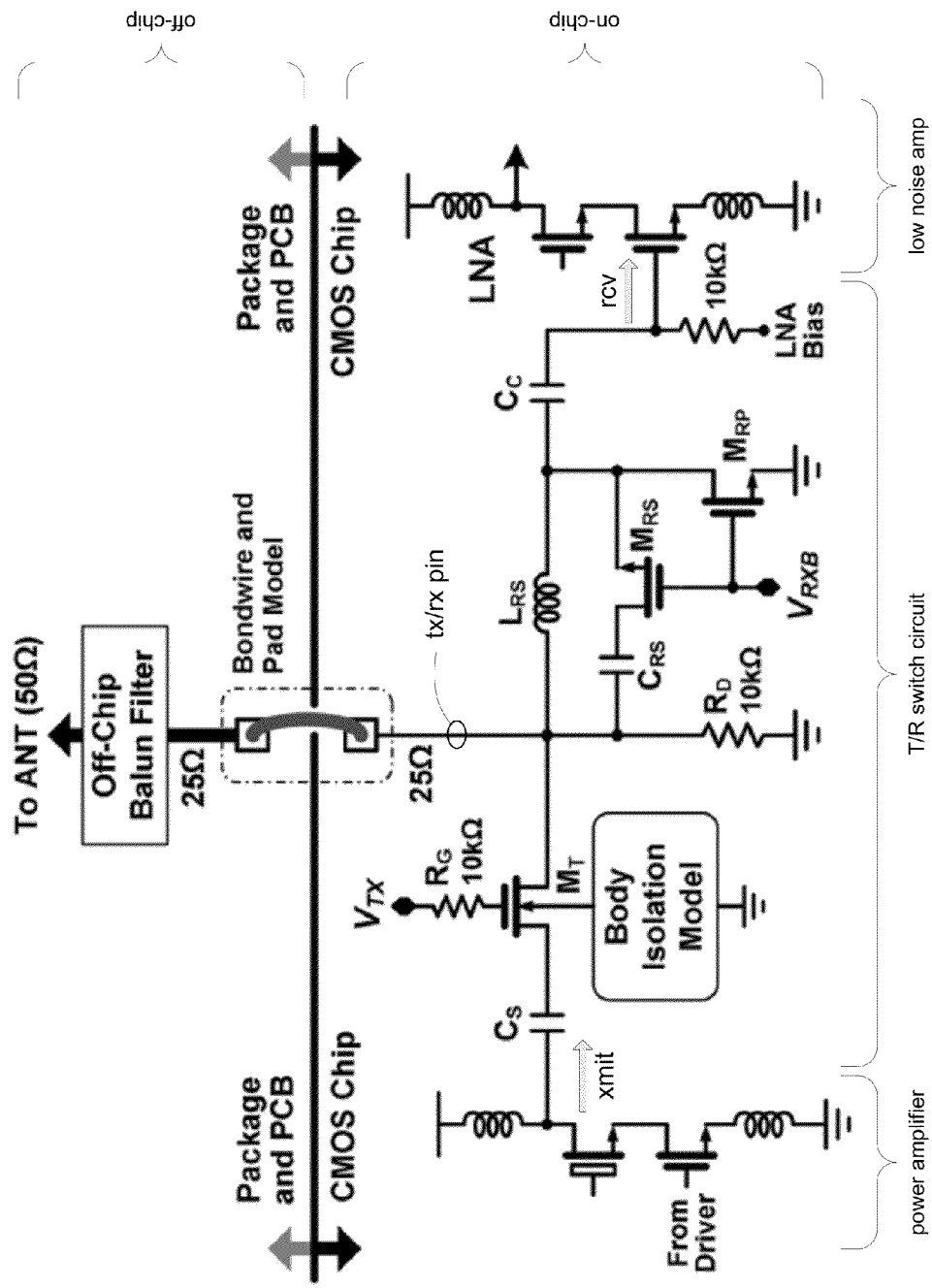
FIG. 6 shows a conventional arrangement of T/R switch circuitry.

In an embodiment, the matching network 6 (FIG. 1) may comprise on-chip components, namely some of the components of the matching network may be integrated on the IC chip 108. Accordingly, the embodiment shown in FIG. 4 provides a board matching network 124 comprising capacitors C2, C3 and an on-board matching network 12 comprising inductor L1. The inductor L1 fabricated on the IC chip 108; i.e., it is on-chip as compared to the capacitors C2, C3 which are off-chip. This configuration may be more acceptable in terms of manufacturing costs. For example, the inductor L1 may be on the order of a few nano-Henries which lends itself to the possibility of integration. The cost of a discrete component vs. the degradation of performance of an integrated circuit version of the component may weigh in favor of integration.

Figure 5:
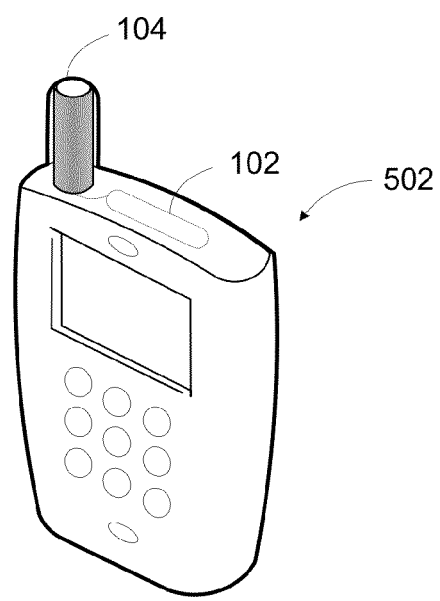
FIG. 5 shows a wireless system incorporating the circuit configuration of the present invention.

FIG. 5 illustrates a wireless communication system 502 incorporating an embodiment of the present invention. For example, wireless communication system 502 can be any handheld device such as a mobile communication device (e.g., cellular telephone), a computing device having wireless communication capability (e.g., laptop, notebook computer), a handheld gaming device having wireless communication capability (e.g., iPod Touch manufactured and sold by Apple Inc.), and so on. The wireless communication system 502 can use any communication standard such as the various IEEE 802 formats (e.g., Bluetooth, 802.11n, 802.11g and so on).

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A transceiver circuit comprising:
an integrated circuit comprising
a first switch configured to transmit a first signal via an antenna,
a second switch,
a first pin configured to receive the first signal from the first switch, and
a second pin configured to receive a second signal; and
an impedance matching network separate from and connected to the integrated circuit via the first pin and the second pin, wherein the impedance matching network is connected to the antenna, and wherein the impedance matching network is configured to
receive the first signal from the first switch via a first bond wire, wherein the first bond wire is connected between the first pin and the impedance matching network,
receive the second signal via the antenna, and
forward the second signal to the second switch via a second bond wire, wherein the second bond wire is connected between the second pin and the impedance matching network.

2. The transceiver circuit of claim 1, wherein the impedance matching network comprises a capacitance and an inductance.

3. The transceiver circuit of claim 1, wherein:
the integrated circuit is affixed to a printed circuit board; and
the impedance matching network is affixed to the printed circuit board.

4. The transceiver circuit of claim 1, wherein:
the integrated circuit is affixed to a first printed circuit board; and
the impedance matching network is affixed to a second printed circuit board.

5. The transceiver circuit of claim 1, wherein:
the integrated circuit includes a second impedance matching network; and
the first pin, the second pin, the first switch, and the second switch are connected to the second impedance matching network.

6. The transceiver circuit of claim 1, wherein the integrated circuit comprises:
   a first amplifier comprising an output connected to the first switch, wherein the first amplifier is configured to output the first signal to the first switch; and
   a second amplifier comprising an input connected to the second switch, wherein the second amplifier is configured to receive the second signal from the second switch.

7. The transceiver circuit of claim 1, further comprising a filter connected between the antenna and the impedance matching network.

8. A wireless communication system comprising the transceiver circuit of claim 1.

9. A method comprising:
   receiving a first signal from an integrated circuit at an impedance matching network, wherein the impedance matching network is separate from and connected to the integrated circuit via a first bond wire, and wherein the first bond wire is connected between (i) a first pin on the integrated circuit and (ii) the impedance matching network;
   transmitting the first signal from the impedance matching network via an antenna;
   receiving a second signal at the impedance matching network via the antenna; and
   transmitting the second signal from the impedance matching network to the integrated circuit via a second bond wire, wherein the second bond wire is connected between (i) a second pin of the integrated circuit and (ii) the impedance matching network.

10. The method of claim 9, further comprising:
    amplifying the first signal via a first amplifier prior to transmitting the first signal via the antenna, wherein the integrated circuit comprises the first amplifier; and
    amplifying the second signal via a second amplifier subsequent to receiving the second signal via the antenna, wherein the integrated circuit comprises the second amplifier.

11. The method of claim 9, wherein the impedance matching network comprises a capacitance and an inductance.

12. The method of claim 9, wherein the integrated circuit and the impedance matching network are affixed to a printed circuit board.

13. The method of claim 9, wherein:
    the integrated circuit is affixed to a first printed circuit board; and
    the impedance matching network is affixed to a second printed circuit board.

14. The method of claim 9, further comprising filtering the first signal via a balun filter prior to transmitting the first signal via the antenna.

15. A transceiver circuit comprising:
    a printed circuit board;
    an antenna assembly comprising a filter, wherein the filter is mounted on the printed circuit board;
    an impedance matching network mounted on the printed circuit board, wherein the impedance matching network is connected to the antenna assembly; and
    an integrated circuit comprising
       a first pin,
       a second pin,
       a first amplifier configured to (i) amplify a first signal, and (ii) transmit the first signal to the impedance matching network via the first pin, and
       a second amplifier configured to receive (i) a second signal from the impedance matching network via the second pin, and (ii) amplify the second signal,
    wherein the impedance matching network is configured to provide impedance matching between (i) the first pin and the second pin, and (ii) the filter.

16. The transceiver circuit of claim 15, wherein the integrated circuit is absent an impedance matching network.

17. The transceiver circuit of claim 15, wherein the integrated circuit includes a second impedance matching network.

18. The transceiver circuit of claim 1, wherein the impedance matching network comprises:
    an inductance connected between the antenna and the second bond wire;
    a first capacitance connected between (i) the antenna and the inductance and (ii) the first bond wire; and
    a second capacitance connected between (i) the antenna, the inductance, and the first capacitance and (ii) a ground reference.

19. The transceiver circuit of claim 18, wherein the integrated circuit comprises:
    a first amplifier configured to amplify the first signal;
    the first switch configured to forward the first signal from the first amplifier to the first bond wire;
    the second switch connected between the second bond wire and a ground reference; and
    a second amplifier connected to the second bond wire and the second switch, wherein the second amplifier is configured to amplify the second signal.

20. The transceiver circuit of claim 1, wherein the impedance matching network comprises:
    a first capacitance connected between the antenna and the first bond wire; and
    a second capacitance connected between (i) the antenna, the second bond wire, and the first capacitance and (ii) a ground reference.

21. The transceiver circuit of claim 20, wherein the integrated circuit comprises:
    a first amplifier configured to amplify the first signal;
    the first switch configured to forward the first signal from the first amplifier to the first bond wire;
    an inductance connected to the second bond wire;
    the second switch connected between the inductance and a ground reference; and
    a second amplifier connected to the inductance and the second switch, wherein the second amplifier is configured to amplify the second signal.

22. The transceiver circuit of claim 1, further comprising a printed circuit board separate from the integrated circuit, wherein:
    the impedance matching circuit is mounted on the printed circuit board;
    the printed circuit board comprises
       a third pin connected to the impedance matching circuit, and
       a fourth pin connected to the impedance matching circuit;
    the first bond wire (i) extends between the integrated circuit and the printed circuit board, and (ii) connects the first pin to the third pin; and
    the second bond wire (i) extends between the integrated circuit and the printed circuit board, and (ii) connects the second pin to the fourth pin.

23. The transceiver circuit of claim 15, wherein the integrated circuit is separate from the printed circuit board.

* * * * *